(12) United States Patent
Josserond et al.

(10) Patent No.: US 9,540,174 B2
(45) Date of Patent: Jan. 10, 2017

(54) ABRASION-RESISTANT BELT

(71) Applicant: Habasit AG, Reinach (CH)

(72) Inventors: Eric Josserond, Village-Neuf (FR); Gregor Sieben, Arlesheim (CH); Urs Gsponer, Münchwilen (CH); Felix Rolle, Binningen (CH)

(73) Assignee: Habasit AG, Reinach (CH)

( * ) Notice: Subject to any disclaimer, the term of this patent is extended or adjusted under 35 U.S.C. 154(b) by 0 days.

(21) Appl. No.: 14/898,311

(22) PCT Filed: Jul. 21, 2014

(86) PCT No.: PCT/EP2014/065618
§ 371 (c)(1),
(2) Date: Dec. 14, 2015

(87) PCT Pub. No.: WO2015/011090
PCT Pub. Date: Jan. 29, 2015

(65) Prior Publication Data
US 2016/0137421 A1 May 19, 2016

(30) Foreign Application Priority Data

Jul. 23, 2013 (EP) .................................... 13177672

(51) Int. Cl.
| | |
|---|---|
| B65G 15/34 | (2006.01) |
| B65H 29/12 | (2006.01) |
| B65H 5/02 | (2006.01) |
| B29C 44/50 | (2006.01) |
| B29C 44/56 | (2006.01) |

(Continued)

(52) U.S. Cl.
CPC .............. *B65G 15/34* (2013.01); *B29C 44/50* (2013.01); *B29C 44/569* (2013.01); *B65H 5/023* (2013.01); *B65H 29/12* (2013.01); *C08J 9/32* (2013.01); *B29K 2075/00* (2013.01); *B29K 2101/12* (2013.01); *B29K 2105/04* (2013.01); *B65G 2207/42* (2013.01); *B65H 2301/321* (2013.01); *B65H 2401/111* (2013.01); *B65H 2401/113* (2013.01); *B65H 2404/262* (2013.01); *B65H 2404/268* (2013.01); *B65H 2404/2612* (2013.01); *B65H 2404/27* (2013.01); *B65H 2404/632* (2013.01); *B65H 2408/111* (2013.01); *B65H 2701/176* (2013.01); *B65H 2701/1916* (2013.01); *C08J 2201/03* (2013.01);

(Continued)

(58) Field of Classification Search
CPC ................................ B65G 15/32; B65G 15/34
USPC .................................................. 198/846, 847
See application file for complete search history.

(56) References Cited

U.S. PATENT DOCUMENTS

| | | |
|---|---|---|
| 3,446,332 A | 5/1969 | Bechtloff et al. |
| 3,880,274 A | 4/1975 | Bechtloff et al. |

(Continued)

FOREIGN PATENT DOCUMENTS

| | | |
|---|---|---|
| WO | 2008/113195 A1 | 9/2008 |
| WO | 2011/094117 A2 | 8/2011 |

*Primary Examiner* — James R Bidwell
(74) *Attorney, Agent, or Firm* — Hodgson Russ LLP

(57) ABSTRACT

A belt having a first cover layer with a first top surface and preferably also a second cover layer with a second top surface, wherein the first cover layer and, if present, the second cover layer are made of a foam having a thermoplastic or thermoplastic elastomer, in particular a TPU or PEBA. The belt is suitable e.g. as a machine tape in mail sorting machines and for power transmission.

19 Claims, 3 Drawing Sheets

(51) Int. Cl.
*C08J 9/32* (2006.01)
*B29K 75/00* (2006.01)
*B29K 105/04* (2006.01)
*B29K 101/12* (2006.01)

(52) U.S. Cl.
CPC ........ *C08J 2300/22* (2013.01); *C08J 2300/26* (2013.01); *C08J 2375/04* (2013.01)

(56) References Cited

U.S. PATENT DOCUMENTS

| | | | | |
|---|---|---|---|---|
| 4,674,622 | A * | 6/1987 | Utsunomiya | B32B 25/10 198/500 |
| 5,595,284 | A * | 1/1997 | Takahashi | B65G 15/36 198/847 |
| 5,708,060 | A * | 1/1998 | Sands | A63B 22/02 106/164.01 |
| 5,951,441 | A * | 9/1999 | Dalebout | A63B 22/02 198/844.2 |
| 7,267,219 | B2 * | 9/2007 | Vogt | F16G 3/10 198/844.1 |
| 2004/0132586 | A1 * | 7/2004 | Leighton | A63B 22/02 482/54 |
| 2010/0035731 | A1 | 2/2010 | Rohr et al. | |

* cited by examiner

ABRASION-RESISTANT BELT

FIELD OF THE INVENTION

The present invention relates to abrasion resistant belts, such as conveyor belts. It also relates to uses of such belts in applications such as in mail sorting machines or in power transmission.

BACKGROUND ART

Conveyor belts are used in order to transport goods, e.g. during their production or processing, or in order to deliver them from one starting point to a point of use. A most common conveyor belt is constructed of one or more traction layers, such as of a woven fabric, to impart the belt the required tensile strength, and one more plastic or rubber layers that are arranged on top of the traction layer(s) an/or in between them. In order to tailor a conveyor belt to certain conditions of use, such as conditions where high chemical resistance, resistance to microbial fouling, and in particular also resistance to abrasion, is required, it has been customary to apply as the outermost layer a layer of a material having the respective property and which thus imparts the overall belt that property. Specifically for the purpose of imparting the belt resistance to abrasion it has been customary to apply onto the belt a cover layer of crosslinked polyurethane or of TPU (thermoplastic polyurethane, thus essentially or even entirely not-crosslinked), these being materials which as such are known to have a high abrasion resistance.

In particular when the conveyed good is paper or cardboard, such as mail, it has been observed by the inventors of the present application that belts with prior art crosslinked polyurethane or TPU surfaces and without rubber covers are prone to "glazing", i.e. they lose surface roughness by the fine polishing action of the paper mail. A "glazed" belt surface is a shiny, polished surface of lowered static friction coefficient with, thus of impaired transporting capacity for, the paper mail. The polishing action arises because there is some relative motion between the belt's top surface and the mail conveyed by it, thus giving rise to friction and concomitant abrasion. Specifically, in a mail sorting machine there are situations where the mail is transported in a sandwiched form between two belts that cooperate with each other by embedding the mail between the top surfaces of the two belts. If in such a dual belt conveying setup the sandwiched mail must be transported along a curve there are invariably speed differences between the inner belt and the outer belt. That speed difference increases with increasing thickness of the mail items. Said speed differences, thus relative motions, may cause friction between the inner belt's top surface, the transported mail and the top surface of the outer belt, with concomitant increased abrasion and "glazing" of the two belts. Consequently the grip between transported goods and the belt decreases and goods are no longer precisely positioned and transported (and/or sorted).

Also in particular with belts used for power transmission, it has been observed by the inventors of the present application that belts with prior art crosslinked polyurethane or TPU surfaces and without rubber covers are prone to the same "glazing". In power transmission applications it often occurs that the belt is in a serpentine-like arrangement, with alternatingly either the belt's first top surface or second top surface coming into contact with, and being bent over, a pulley. In such a serpentine-like arrangement both the belts first and second top surfaces are equally required for transmission of power. By virtue of said "glazing" occurring on one or, in the serpentine-like arrangement, even on both top surfaces, belt slippage will occur and the belt has to be re-tensioned in order to increase the shaft load above the critical limit which is required for transmission of power without slippage.

CA 1021509 A discloses a elastomeric, thus crosslinked polyurethane foam conveyor belt. The foam is abrasion-resistant, but has a solid or nearly solid so-called "skin" on its surface (i.e. a surface portion with near-zero foaming degree), and the publication hints at that it is that skin that retains at the foam's surface the abrasion resistance of the unfoamed polyurethane.

DE 37 10 160 A discloses a conveyor belt having a foamed cover layer 12 which may be of foamed polyurethane. There is no disclosure as to whether it is an elastomeric or thermoplastic/thermoplastic elastomeric polyurethane. The foam should again cover itself with a "closed skin", or is covered by an explicit polyurethane skin 14 (column 6, lines 11-19). The plastic material of the cover layer 12 having such skin is said to have a "flexible, abrasion resistant surface".

U.S. Pat. No. 4,752,282 discloses a flat drive belt having a symmetrical construction around a central traction layer and a method of transmitting rotary motion from one pulley 27 to another pulley 30 using that belt.

WO 00/44821 discloses low density foamed TPU's which were blown using a few percent of expandable microspheres, optionally in combination with other exothermic or endothermic blowing agents. The foams have a "relatively thin skin". In the abrasion tests of table 2 it was observed that TPU foams blown with solely expandable microspheres had a lower abrasion resistance (more abraded material) than the TPU foams blown without expandable microspheres, even when blown to very similar foaming (comparative examples 1 and 3, example 4).

WO 2005/026243 discloses mixtures of TPU with EPM rubber or with modified EPM rubber blown with expandable microspheres and optional other blowing agents. This publication hints at the bottom of page 2 that foaming pure TPU to a density of less than 1.0 g/cm$^3$ is at the expense of its abrasion resistance. Tested was the abrasion resistance of, among others, a) pure TPU blown with only expandable microspheres, b) pure TPU blown with expandable microspheres and chemical blowing agent, c) TPU/EPM-rubber mixture blown with only expandable microspheres, and d) TPU/EPM-rubber mixture blown with expandable microspheres and chemical blowing agent (entries R2, R1, V1.3 and V1.1, respectively, in table 1); all these were blown to very similar densities. The observed amount of abraded material increased (thus the abrasion resistance decreased) in the order d), c), b), a).

WO 2008/113195 A discloses a treadmill belt wherein a first foamed layer of a thermoplastic foam is arranged on top of a first traction layer. In the simplest construction the first foamed layer 12 may be the cover layer of the belt. The thermoplastic of the first foamed layer may be TPU. This publication does not say anything about abrasion resistance of the thermoplastics.

WO 2010/103096 A discloses a belt with a foam layer of a thermoplastic elastomer of a Shore A hardness of at the most 85 in the unfoamed state, which may be TPU. That foamed layer preferably forms the cover layer (page 8, lines 18-24). Two belts with a foam cover layer of a "blend of elastomer and TPE-U (Versollan RU 2204X) Shore A 55 unfoamed" and "polyester-based TPE-U (Laripur 70251) Shore A 70 unfoamed", respectively, were tested for several physical parameters, among which the "nose bar test". The test comments on the abrasion, but in view of the way a nose bar test is done this could only relate to the abrasion of a backside fabric traction layer present in the tested belt, that fabric being in contact with the nosebar.

U.S. 2006/0163042 discloses in examples 1 and 3 a butt-weldable conveyor belt having only one (central) fabric traction layer and one layer of polyester-based unfoamed TPU (Estane 58277) on each side of the traction layer. The layer construction of this belt is thus symmetrical about the central traction layer.

U.S. Pat. No. 3,880,272 discloses a belt with two foamed cover layers, wherein the material of the foams may be plastic or polyurethane. It also discloses a conveyer system where two belts, each having a foamed layer, are in contact with each other and encase the goods to be conveyed within their foamed layers.

The applicant of the present application marketed at the time of filing of the instant application special types of conveyor belts which are used for conveying mail and for sorting it, called "machine tapes", exemplary ones having type codes MAB-02, MAB-05 and MAB-8E. The first two consist of a top (mail conveying) layer of unfoamed TPU and of a back (pulley side) layer of an unfoamed crosslinked polyurethane. These two machine tapes are thus of unsymmetrical layer construction. They do not contain any fabric layer. The third machine tape has a symmetrical construction with a fabric layer laminated on both sides with TPU films.

The instant invention seeks to provide a further abrasion-resistant belt that is in particular suitable for use as a machine tape or in power transmission.

SUMMARY OF THE INVENTION

The present invention thus provides:

1. A belt comprising a first cover layer with a first top surface, characterised in that the first cover layer consists of a foam comprising a first thermoplastic or first thermoplastic elastomer, wherein the foam of the first cover layer is a closed cell foam and the first cover layer is devoid of a skin.

2. The belt of above 1, comprising a second cover layer with a second top surface, characterised in that the second cover layer consists of a foam comprising a second thermoplastic or second thermoplastic elastomer, wherein the foam of the second cover layer is a closed cell foam and the second cover layer is devoid of a skin.

3. The belt of above 1, characterised in that the foams of the first and second cover layers contain expanded microspheres.

4. The belt of one of above 1 to 3, characterised in that the foam of the first cover layer comprises a first thermoplastic elastomer, in particular TPU or PEBA, most preferably TPU.

5. The belt of above 2 or 3, characterised in that the foam of the second cover layer comprises a second thermoplastic elastomer, in particular TPU or PEBA, most preferably TPU.

6. The belt of above 2, 3 or 5, characterised in that the first cover layer comprises a first thermoplastic elastomer and the second cover layer comprises a second thermoplastic elastomer, and in that the first thermoplastic elastomer and the second thermoplastic elastomer are identical.

7. The belt of one of above 1 to 6, characterised in that the foaming degree of the first cover layer is 1 to 60%, preferably 20 to 40%.

8. The belt of one of above 2, 3, 5 or 6, characterised in that the foaming degree of the second cover layer is 1 to 60%, preferably 20 to 40%.

9. The belt of one of above 2, 3, 5, 6 or 8, characterised in that the foaming degree of the first cover layer is the same as the foaming degree of the second cover layer.

10. The belt of one of above 1 to 9, characterised in that it comprises a central traction layer comprises a fabric or consists of a fabric.

11. The belt of one of above 2, 3, 5, 6, 8 or 9, characterised in that it comprises a central traction layer comprising a fabric or consisting of a fabric and in that it has a layer construction which is symmetrical about the central traction layer.

12. A belt conveyor for conveying goods comprising an endless belt by which the goods are conveyed, characterised in that the endless belt is an endless belt according to one of above 1 to 11, and in that the endless belt is arranged horizontally and the goods are conveyed on the first top surface.

13. A belt conveyor for conveying goods comprising an endless belt by which the goods are conveyed, characterised in that the endless belt is an endless belt according to one of above 1 to 11, and in that the endless belt is arranged perpendicularly, and the goods are conveyed by the first top surface in cooperation with one or more rotatable pulleys which press the goods against the first top surface.

14. A belt conveyor for conveying goods comprising an endless belt by which the goods are conveyed, characterised in that the endless belt is an endless belt according to one of above 1 to 11, and in that the endless belt is arranged perpendicularly, and the goods are conveyed by the first top surface in cooperation with a second endless belt according to one of above 1 to 10, which runs in the same direction and in the same speed as the endless belt and which presses the goods against the top surface.

15. A belt conveyor for conveying goods comprising an endless belt by which the goods are conveyed, characterised in that the endless belt is an endless belt according to one of above 1 to 11, and in that the endless belt is arranged perpendicularly, and the goods are conveyed by the first top surface in cooperation with a fixed support having a sliding surface, said sliding surface pressing the goods against the first top surface.

16. The belt conveyor according to one of above 12 to 15, characterised in that the goods to be conveyed is paper or a paper-made good, cardboard or a cardboard-made good, or mail.

17. A method of transferring a rotary motion from a rotating drive wheel, rotating drive pulley or rotating drive roll to one or more idler wheels, idler pulleys or idler rolls using an endless belt looping around the rotating drive wheel, drive pulley or drive roll and around the one or more idler wheels, idler pulleys or idler rolls, characterised in that the endless belt is an endless belt according to one of above 2, 3, 5, 6, 8, or 9.

18. The method of above 17, characterised in that it transfers rotary motion to one or more first idler wheels, first idler pulleys or first idler rolls being in contact with the second top surface of the belt, each first idler wheel, first idler pulley or first idler roll imparting the belt looping around it a convex bend; and that it also transfers rotary motion to at least one second idler wheel, second idler pulley or second idler roll being in contact with the first top surface of the belt, each second idler wheel, second idler pulley or second idler roll imparting the belt looping around it a concave bend.

DETAILED DESCRIPTION OF THE INVENTION

The belt of the present invention comprises a first cover layer and optionally also a second cover layer, both consisting of a foam comprising a thermoplastic or thermoplastic elastomer.

Suitable thermoplastics are e.g. polyolefins (such as polyethylene or polypropylene); poly(meth)acrylates; polymers of vinyl halogenides such as vinyl chloride (i.e. PVC) or vinyl fluoride; polymers of vinyl acetate; copolymers of olefins with vinyl halogenides and/or with vinyl acetate (such as ethylene/vinyl acetate EVA; or vinyl chloride/ethylene/vinyl acetate VCEVAC); thermoplastic PA's such as PA 6, PA 11, PA 12, PA 66, PA 69, PA 610, PA 612, PA 6T, PA 6-3-T, PA MXD6; polyesters such as for example PET or PBT. Among these thermoplastics PVC is preferred for both the first and second cover layer.

Suitable thermoplastic elastomers can be divided into several classes:

1) Substantially random ethylene/$C_{3-12}$-α-olefin copolymers. Examples of the α-olefins are 1-propene, 1-butene, 1-pentene, 1-hexene and 1-octene; the most preferred being 1-octene. These copolymers can be produced by so-called "single-site" catalysts in combination with polymeric methyl aluminoxane [MAO, -(Me-Al—O)$_n$—] as co-catalyst. Preferred examples of such catalysts are the "single-site" catalysts from Dow Chemicals known under the name INSITE™ and those from Exxon Mobil Chemicals known under the name EXXPOL®. Examples of thermoplastic elastomeric ethylene/α-olefin copolymers are the Affinity™, Engage® and Versify™ copolymer families (Dow) or the Exact™ copolymer family (DEX-Plastomers). One or more of these random copolymers may optionally be blended with a compatible thermoplastic polyamide (TPA) or thermoplastic polyurethane (TPU) and/or with a compatible thermoplastic polyolefin (TPO, such as polyethylene or polypropylene). Example for such later binary, ternary or higher-order blends are the Versalloy™ and Versollan™ blends (GLS corporation).

2) Thermoplastic elastomeric block copolymers. A first subgroup within these are block copolymers of oligomers of styrene and of oligomers of other olefinic monomers, also called styrenic block copolymers (SBC's). Examples are styrene-butadiene-styrene (SBS), styrene-isoprene-styrene (SIS), styrene-ethylene/butylene-styrene (SEBS) and styrene-ethylene/propylene-styrene (SEPS) block copolymers. Specific examples thereof are the Styroflex® copolymer family (BASF) and the Kraton® copolymer family (Kraton). A second subgroup are copolymers of hard blocks of medium density polyethylene and of soft blocks of ethylene/α-olefin copolymer, in particular of ethylene/1-octene copolymer, the latter as outlined under above 1). An example is the Infuse® family of copolymers (Dow). A third subgroup are TPE-U's, such as copolymers of polyester diols or polyether diols with diisocyanates, or TPE-U's based on polycarbonate. The polyester diol may be formed from adipic acid and butanediol; the polyether diol may be for example a polyaddition adduct of ethylene oxide and/or propylene oxide; and the diisocyanate may be in particular diphenylmethane 4,4'-diisocyanate. The TPE-U can also be a TPE-U based on polycarbonate. Examples here are the Pellethane® copolymer family (Dow Chemical). A fourth subgroup are TPE-E's such as the Arnitel® (DSM) and Hytrel® (DuPont) copolymer families. A fifth subgroup are polyether-/ester block amides (TPE-A's), such as in particular polyester block amides or polyether block amides (PEBA). The polyamide blocks therein may e.g. be of PA-6 or PA-66. All these may optionally be blended with a compatible thermoplastic selected from those outlined below under 3).

3) Blends of thermoplastics and true (crosslinked or vulcanized) elastomers, wherein the elastomer is miscible with thermoplastic in its molten state, or is dispersible therein. Examples for the thermoplastics in these blends may be as exemplified above for the thermoplastic itself, with the proviso that it is compatible with the elastomer. The elastomer in these blends has already been crosslinked using suited co-monomers, or already has been vulcanized, before mixing with the thermoplastic. Examples for the crosslinked or vulcanized elastomer in these blends include, but are not limited to, natural rubber, polyisoprene, polybutadiene, styrene-butadiene rubber (SBR), nitrile-butadiene rubber (NBR), ethylene-propylene-diene rubber (EPDM) and acrylate rubbers. Specific examples for the blends are blends of homo- or copolymers of vinyl chloride with elastomers, such as PVC/NBR or VCEVAC/NBR, the PVC homopolymer component in these being optionally softened with an appropriate softener (such as phthalates, e.g. dioctylphthalate, or esters of aliphatic dicarboxylic acids) in order to obtain the necessary Shore A hardness for the unfoamed blend; blends of polyethylene or polypropylene with EPDM, particularly polypropylene/EPDM blends with a mass fraction of about 35 to 45% by weight, based on the blend, of polypropylene; and blends of thermoplastic polyamides with elastomers, such as PA6/EPDM, PA6/SBR, PA66/EPDM, PA66/SBR, PA11/EPDM, PA11/SBR, PA12/EPDM and PA12/SBR, the PA component in these being optionally softened with an appropriate softener (such as aromatic sulfonamides, e.g. N-butylbenzenesulfonamide) in order to obtain the necessary Shore A hardness for the unfoamed blend.

4) Thermoplastic elastomer alloys. These are similar to the blends exemplified under above 3), except that the elastomer is crosslinked in situ during the mixing with the molten thermoplastic, during which also some chemical bonding between elastomer and thermoplastic may occur. A first subgroup among these are thermoplastic vulcanizates (TPV's). Here, the crosslinkable elastomer is a vulcanizable elastomer containing olefinic unsaturations. Examples thereof are natural rubber, polyisoprene, polybutadiene, styrene-butadiene rubber (SBR), nitrile-butadiene rubber (NBR) and ethylene-propylene-diene rubber (EPDM). The vulcanization may be done during mixing with the thermoplastic using a suited curing agent such as sulfur, sulfur compounds or peroxides. The thermoplastic component for TPV's is preferably a saturated polyolefin, such as polyethylene or polypropylene. Examples are the Santoprene®, Geolast® (Monsanto) and Alcryn® (DuPont) alloys.

5) Thermoplastic elastomeric ionomers. These are preferably copolymers of an olefinic monomer (in particular ethylene) and an α,β-ethylenically unsaturated $C_{3-6}$carboxylic acid optionally with a co-polymerized softening olefinic monomer which may be selected from vinyl esters of saturated $C_{2-6}$-carboxylic acids (in particular vinylacetate) and $C_{1-4}$alkylvinyl ethers (in particular ethylvinyl ether), and wherein the carboxylates of the ionomer have at least partially been neutralised with metal ions derived from alkali metals (in particular from sodium), from zinc and from aluminium. An example is poly(ethylene-co-methacrylate), an example being the Surlyn® copolymer family (DuPont).

The thermoplastics or thermoplastic elastomers of the foams of the first and optional second cover layers may be different or identical. The latter is preferred. More preferred is that the foams of both the first and optional second cover layers comprise one and the same thermoplastic elastomer.

A preferred example of the thermoplastic elastomer for both the first and the optional second cover layer is thermoplastic polyurethane (TPU). TPU's suitable for the first and optional second cover layers are generally obtainable by reacting diisocyanate-containing hard block segments with polyester diol soft block segments in such amounts that the molar ratio of isocyanate groups to isocyanate reactive hydroxy groups $N_{NCO}/N_{OH}$ present in the reaction mixture is between 0.9 and 1.1, preferably between 0.95 and 1.05, and most preferably between 0.99 and 1.01. In this quotient, $N_{NCO}$ is the number of isocyanate groups in the mixture, obtainable by amine titration and back-titrating excess amine with standard acid and expressed in mmol isocyanate groups per g of dry (or neat, solvent-free) weight of mixture, and $N_{OH}$ is the hydroxyl value of the compound mixture, expressed in mmol hydroxyl groups per g of dry (or neat, solvent-free) weight of mixture.

The diisocyanate-containing hard blocks are obtainable by reacting a diisocyanate with a diol chain extender. The diisocyanate may be a pure compound or a mixture of diisocyanates. In one preferred embodiment the diisocyanate is an aromatic diisocyanate, more preferably one of the isomeric 2,2'-, 2,4' or, preferably, 4,4'-diphenylmethane diisocyanates. Suitable diol chain extenders include aliphatic $C_2$-$C_6$-diols, such as ethylene glycol, 1,3-propanediol, 1,4-butanediol, 1,5-pentanediol, 1,6-hexanediol, 1,2-propanediol, 2-methylpropanediol, 1,3-butanediol, 2,3-butanediol, 1,3-pentanediol, 1,2-hexanediol and 3-methylpentane-1,5-diol, or glycol ethers, such as diethylene glycol, dipropylene glycol and tripropylene glycol, and aminoalcohols such as ethanolamine, N-methyldiethanolamine and the like.

The polyester diol soft segments used preferably have a molecular weight of between 500 and 20000. They may be prepared by reaction of a diol with a dicarboxylic acid, or, more conveniently, by reaction of a diol with the dimethyl ester of the dicarboxylic acid (transesterification) and boiling off the low-boiling methanol. Diols for the polyester diol are aliphatic linear or branched $C_2$-$C_8$ diols which optionally may contain a carbocyclic saturated $C_5$-$C_6$ ring. Examples therefor are ethylene glycol, propylene glycol, diethylene glycol, 1,4-butanediol, neopentyl glycol, 2-methylpropanediol, 3-methylpentane-1,5-diol, 1,6-hexanediol or cyclohexane dimethanol, and mixtures of such diols. The dicarboxylic acids for the polyester diol are aliphatic linear or branched $C_2$-$C_8$ dicarboxylic acids. Examples therefor are oxalic, malonic, succinic, glutaric and adipic acids or their dimethyl esters, sebacic acid, phthalic anhydride, tetrachlorophthalic anhydride or dimethyl terephthalate or mixtures thereof.

The TPU is produced by reaction of the diisocyanate-containing hard block with the polyester diol soft segments, using respective free and reactive end groups.

Most preferred thermoplastic elastomers for both cover layers are the Estane® TPU types of Lubrizol. More preferred are Estane® 58277, Estane® 54600 and Estane® 54610; most preferred is Estane® 58277.

The TPU's suitable for the foamed first and optional foamed second TPU cover layers are preferably neither blended nor alloyed with other types of polymers. The TPU's suitable for the foamed first and second TPU cover layers are preferably also essentially free of other organic compounds consisting only of C, H, N and O, with the exception of usual amounts of antioxidants effective in preventing oxidation and/or in enhancing stability to heat, selected from the group consisting of BHT and customary antioxidants containing one or more 3,5-di-tert-butyl-4-hydroxyphenol moieties (e.g. the Irganox® type antioxidants). Commercially available TPU's suitable for calendering have often processing aids added thereto. These processing aids are also among the said organic compounds consisting only of C, H, N and O. The TPU's suitable for the instant invention preferably have a total content of not more than 1% by weight, preferably not more than 0.2% by weight, based on the TPU, of such processing aid(s). TPU's suitable for the instant invention are thus preferably so-called "extruder grades", rather than so-called "calendering grades". Allowed are however phosphate-type plasticizers, in particular triphenyl phosphate, in amounts effective to plasticize the TPU to a notable extent.

TPU and the said phosphate plasticizers are materials of rather high density. On the other hand the said organic compounds consisting only of C, H, N and O generally have densities of close to 1 g/cm$^3$. The degree of presence of the said phosphate-type plasticizers and antioxidants in the TPU, and the degree of absence of the other abovementioned organic compounds containing only C, H, N and O in the TPU, can thus be conveniently specified by the TPU's density, which in the unfoamed state at room temperature is preferably in the range of 1.18 to 1.22 g/cm$^3$. The amounts and types of the extractables present in TPU may be determined by the supercritical carbon dioxide fluid extraction technique coupled with GC-MS described in Polymer International 27, pp. 157-164 (1992).

The thermoplastic elastomers suitable for the instant invention, in particular the TPU's, have a Shore A hardness in the unfoamed state of preferably 60 to 100, more preferably of 70 to 95.

The nominal foaming degree is for both cover layers preferably in the range of 1 to 60%, more preferably of 20 to 40%, whereby the foaming degree is calculated from the densities in the foamed and unfoamed state:

$$r = \frac{(\rho_u - \rho_g)}{\rho_u} \times 100$$

In this formula, r is the degree of foaming in percent, $\rho_u$ is the density of the unfoamed thermoplastic elastomer as a homogeneous mixture with all further facultative additives such as for example dyes, and $\rho_g$ is the density of an equal amount of the same thermoplastic elastomer mixture in the form of the blown foam.

In the instant invention the foaming degree of the foamed cover layers does not vary appreciably throughout the foamed layer(s), i.e. the foaming degree at any location within the foamed layer preferably deviates by less than 20%, more preferably by less than 10%, from the nominal foaming degree as calculated by the above formula. In the instant invention the foamed layer(s) do not have a so-called "skin" as explained in the introduction for some prior art publications. The avoidance of a skin may be achieved by having an essentially uniform temperature in the entirety of the foaming mixture for the entire time required to foam the foaming mixture up to the desired nominal foaming degree as calculated above. Such essentially uniform temperature throughout the foaming mixture is easily achievable by forming the foam in an heated single-screw or twin-screw extruder (see below).

Each of the foamed cover layers preferably comprises the thermoplastic or thermoplastic elastomer as described before in amounts of at least 80% by weight, more preferably at least 90% by weight, most preferably at least 98% by weight, based on the foamed cover layer.

The thicknesses of any foamed layers are preferably in the range of 0.4 to 1.0 mm. In a first preferred embodiment of the belt, that thickness is preferably in the range of 0.5 to 0.7 mm. This embodiment of the belt is suitable as a machine tape as described in the introduction. In a second preferred embodiment of the belt of the invention that thickness is preferably in the range of 0.6 to 1.0 mm. This embodiment of the belt is suitable as power transmission belt, i.e. for transmitting rotary motion from one wheel, pulley or roll to another wheel, pulley or roll.

The overall thickness of the belt of the invention is preferably in the range of 1.0 to 3.0 mm. In the above first preferred embodiment of the belt that overall thickness is preferably in the range of 1.0 to 2.0 mm. In the above second preferred embodiment of the belt that overall thickness is preferably in the range of 1.5 to 3.0 mm.

The thicknesses of the individual layers of the belt of the invention can be determined either on the belt itself or after its separation into the individual layers (cutting open, milling off or detaching of layers). However, it may happen that one of the layers does not have a geometrically sufficiently clear shape. In this case, instead of the geometric thickness, the thickness h can be determined as the quotient of the weight per unit area of the layer, $G_L$, (kg/m$^2$) and the mass-average density of all materials in the layer, $\rho$, (kg/m$^3$):

$$h = \frac{G_L}{\rho} = \frac{G_L}{\frac{\sum_{i=1}^{N} m_i \rho_i}{\sum_{i=1}^{N} m_i}}$$

where $m_i$ is the amount of the i-th material of the layer (kg) and the summing is over all N materials occurring in the layer.

Foaming of the thermoplastic elastomer can firstly be carried out by direct admixture of a blowing agent to it. The blowing agent may be a physical blowing agent. Examples of physical blowing agents are chlorofluorocarbons such as for example Frigen, Kaltron, Freon, Frigen, R11 and R12; hydrofluoroalkanes such as for example HFA 134 or HFA 227; and aliphatic linear, branched or cyclic ($C_4$-$C_8$)-hydrocarbons such as for example $C_5$-hydrocarbons (for example n-pentane, isopentane, neopentane, cyclopentane); $C_6$-hydrocarbons (for example n-hexane, isohexane, methylcyclopentane, cyclohexane), $C_7$-hydrocarbons (for example n-heptane, isoheptane, methylcyclohexane, cycloheptane) and $C_8$-hydrocarbons (for example octane, cyclooctane, isooctane, 1,2-, 1,3- or 1,4-dimethylcyclohexane). These hydrocarbons can be used in pure form or as hydrocarbon fractions of appropriately delimited boiling range, in which the respective hydrocarbons occur more or less dominantly (petroleum ether fractions). Further examples are blowing agents which are gaseous at room temperature, i.e. about 25° C., examples being $N_2$, $CO_2$, methane or argon; water; halogenated hydrocarbons such as for example dichloromethane, perchloroethylene and 1,1,1-trichloroethane; and low-boiling (i.e. boiling range about 60-100° C.) alcohols such as for example methanol, ethanol, propanol, isopropanol and tert-butanol. On the other hand, the blowing agent may also be a chemical blowing agent; chemical blowing agents only release the blowing gas, in particular nitrogen or carbon dioxide, upon heating. Examples of useful chemical blowing agents are azo compounds, such as for example AIBN; hydrazine derivatives, such as for example benzenesulfonyl hydrazine; N-nitroso compounds; and easily decarboxylable carboxylic acids such as for example β-keto carboxylic acids. Physical blowing agents are preferred according to the present invention. The blowing agent is preferably selected such that it mixes very readily with the thermoplastic elastomer material to be foamed. This means that apolar thermoplastic elastomer materials, for example, an apolar blowing agent such as one of the above gaseous blowing agents or one of the above hydrocarbons or chlorofluorocarbons is used. On the other hand, water or one of the above alcohols can be used as a blowing agent for a more polar or hydrophilic thermoplastic elastomers. The amount of blowing agent is primarily determined by the desired degree of foaming. It may preferably be in the range from about 1 to about 10 percent by weight, based on the total amount of the thermoplastic elastomer to be foamed.

Foaming may secondly also be carried out by admixing so-called "expandable microspheres" to the thermoplastic elastomer material. Expandable microspheres have been known for a long time. They are formed by surrounding one of the above-exemplified, preferably physical blowing agents (in particular a water-insoluble blowing agent being liquid room temperature such as for example the abovementioned hydrocarbons, hydrofluoroalkanes or chlorofluorocarbons) by means of aqueous emulsion polymerization with a polymeric casing, for example of copolymer of acrylate/methacrylate and vinyl chloride. In the process, the blowing agent becomes encapsulated in the polymeric skin to form the said microspheres. Preferred are such expandable microspheres which, when blown to their maximum possible size before they collapse, have an expanded article size, or expanded diameter, in the range of 100 to 140 μm, more preferably in the range of 110 to 130 μm, and most preferably 115 to 125 μm. Preferred is the use of such microspheres as a masterbatch with ethylene/vinyl acetate (EVA) copolymer as the carrier; preferably the concentration of the microspheres in the masterbatch is 55 to 75% by weight, more preferably 60 to 70% by weight, and most preferably 64 to 66 percent by weight, based on the masterbatch. A commercially available example of such expandable microspheres comprised in an EVA carrier masterbatch are the Expancel® type expandable microspheres.

The foam suitable for the cover layer(s) of the belt of the instant invention is preferably a "closed-cell" foam, as is customarily understood in the art. To obtain a "closed-cell" foam of uniform foaming degree within the above mentioned 20%, and devoid of a "skin" as outlined in the introduction, it is preferred that the blowing agent is the abovementioned "expandable microspheres".

For the foaming it is preferred on the one hand that either the blowing agent be added in free form to the thermoplastic elastomer and the foaming be carried out using extrusion coating with simultaneous application to the supporting layer, such as one of the traction layers. It is preferred on the other hand to perform the foaming separately in an extruder, in which case the blowing agent is preferably added in the form of the abovementioned expandable microspheres and the foamed first layer thus obtained is subsequently applied in a second operation to the supporting layer by calendering.

The bonding together of foamed layer(s) and traction layer can be done by calendering, extrusion coating or laminating, optionally by co-use of suitable hot-melt or duroplastic adhesive layers. These methods and adhesives are per se all known to the person skilled in the art. Preferred is the formation of the first and optional second cover layers by extrusion coating using a flat-die extruder or broad slit extruder having one or two screws, at a temperature sufficient to melt the thermoplastic elastomer and to cause the blowing agent to expand.

In the case where the thermoplastic elastomer is a TPU the extrusion is preferably done without addition of further isocyanates. The polymer chain degradation that is often observed upon extruding a TPU melt is acceptable and is considered not detrimental for the purposes of the instant invention.

The layer construction of the belt of the invention is preferably such that it is symmetrical about one single, central traction layer. This means that for each layer in the layered compound structure on the one side of the central traction layer there is a corresponding layer of the same type in the layered compound structure on the other side of the traction layer, and, if the belt comprises two or more layers on each side of the central traction layer, that the order of the layers on the one side of the traction layer is inverted with respect to the order of the corresponding layer(s) on the other side of the traction layer. That a layer and a corresponding layer are the "same type" means that they have the same function (such as that they are both "adhesive layers" or both "cover layers") and/or that they have same constitution (such as that they are both "foamed layers" and/or "plastic layers" or "elastomeric layers"). More preferably the symmetrical arrangement of the layer(s) is such that for each layer on the one side of the central traction layer there is a corresponding layer, identical to it with respect to composition and structure except for its thickness which may be different, on the other side of the traction layer. In a more preferred embodiment the symmetrical arrangement of the layer(s) is such that for each layer on the one side of the traction layer there is a corresponding layer, identical to it in every respect, on the other side of the traction layer.

The central traction layer comprises a fabric or consists of a fabric. The fabric may be any type of fabric. Examples therefore are plain weave fabrics and twill weave fabrics. The latter may e.g. be a m/n twill weave fabric, wherein m is an integer number from 1 to 50 and n is an integer number from 1 to 4. The warps of the fabric preferably are yarns of spun fibers; more preferably they are of a polyester such as PET. The wefts of the fabric preferably are monofilaments, also more preferably of a polyester such as PET. Most preferred, particularly in the case where the belt of the invention comprises exactly one central traction layer, is a plain weave PET fabric.

The belt of the invention can be used in any spatial orientation. A first example is horizontal operation (in use the belt's first top surfaces and second top surfaces are horizontal; the normal vectors to the belt surfaces are perpendicular). An exemplary such use is as a conveyor belt for conveying any type of goods. A second example is vertical operation (in use the belt surfaces are perpendicular; the normal vectors to the belt surface may have any direction within a horizontal plane). An exemplary and preferred such use is as a machine tape, i.e. the use in a mail sorting machine that sorts mail depending on the recipient's address. Since here the belt is operated perpendicularly some type of guiding means, such as a guiding rails, and a support may be necessary for such perpendicular use. The transported good, such as mail, rests on the support and is driven forward between belt and guiding means. A third example is an inclined orientation (in use the belt surface is neither horizontal nor perpendicular, the normal vector to the belt surface may have any direction other than exemplified before).

The belt of the invention does preferably not have any further covering layers atop of the first and optional second cover layer(s), i.e. the first top surface forms one outermost surface of the belt, which, depending on the application, forms the surface by which a good is conveyed or the surface that comes into contact with the pulleys. The second cover layer, if present, forms the other, second outermost surface of the belt by which a good is conveyed or the surface that comes into contact with the pulleys.

The belt of the invention preferably has planar first and second top surfaces, devoid of any profiling. It is thus preferably neither a v-belt nor a toothed belt.

The belt of the invention does not have laterally projecting support strips in, at or near its neutral plane. As such laterally projecting "support strips" are understood projections extending laterally from the lateral sides of the belt, by a distance long enough and being sufficiently rigid such as that the belt could be supported by such lateral supports on a pulley, instead of being supported on the pulley over the belt's top surface(s).

The belt of the present invention is in particular suited for any applications in the field of mail or paper processing. A preferred belt of the invention according to below described embodiment a) has been running for 11 months in a typical mail sorting installation in the U.S. as a belt that conveys mail, i.e. as a machine tape, without undergoing excessive abrasion or appreciable "glazing" at neither its first top surface nor its second surface. This behaviour of the inventive belt in real-world mail sorting machines is surprising because on the one hand a laboratory abrasion test designed by the applicant, intended to closely mimic the abrasive conditions in such a mail sorting machine and using cardboard as the abrasive material, consistently showed a much lower abrasion resistance of inventive belts with foamed TPU cover layers in comparison to corresponding reference belts having the same features except that the cover layers are of the respective unfoamed TPU. It is surprising on the other hand because another laboratory abrasion test customarily used in the art, the so-called "Taber test", which is not related to the abrasion conditions arising in a mail sorting machine, showed unpredictable abrasion behaviour of inventive belts with foamed TPU cover layers, in comparison to corresponding reference belts having the same features except that the cover layers are of the respective unfoamed TPU.

Similarly, the preferred belt of the invention with two foamed cover layers is in particular suited for transferring rotary motion, i.e. for power transmission. In the power transmitting setup and power transmitting process of the invention the belt's second top surface is in contact with the drive wheel, drive pulley or drive roll, and the belt's second top surface and/or the belt's first top surface is in contact with the one or more idler wheels, idler pulleys or idler rolls. Power transmission from drive wheel, drive pulley or drive roll to the belt occurs only by the contact between drive wheel, drive pulley or drive roll and belt's second top surface. Power transmission from the belt to the one or more idler wheels, idler pulleys or idler rolls occurs only by the contact between the belt's second top surface and/or the belt's first top surface and the one or more idler wheels, idler pulleys or idler rolls. In one preferred configuration a rotary motion transmitting setup consists of one drive wheel, drive pulley or drive roll and one or more first idler wheels, first idler pulleys or first idler rolls. The belt, made endless, loops around all of them, whereby a convex bend is imparted the belt by each of them. A noticeable convex bend ensures a sufficient contact surface between belt and first idler wheel, first idler pulley or first idler roll (see also below). The loop formed by the endless belt may have in a side view the shape of a more or less irregular polygon with rounded corners, each of these rounded corners being formed by one of the wheels, pulleys or rolls. The first idler wheel(s), first idler pulley(s) or first idler roll(s) all have the same sense of rotation (clockwise or counterclockwise) which in turn is identical to the sense of rotation of the drive wheel, drive pulley or drive roll. There may be provided upstream of an idler wheel, idler pulley or idler roll, or downstream of it, or even both upstream and downstream of it ("upstream" and "downstream" are seen in the travel direction of the belt), a pressure roller such that it is (they are) in contact with the belt's first top surface. The belt runs in a concave bend around the backside of the pressure roller(s), as opposed to the convex bend by which the belt runs around the first idler wheel, first idler pulley or first idler roll. The pressure roller(s) enlarge(s) the pressure that is exerted by the belt's second top surface onto the surface of the first idler wheel, first idler pulley or first idler roll and/or enlarge(s) the convex bend of the belt around the first idler wheel, first idler pulley or first idler roll.

In another preferred configuration the rotary motion transmitting setup consists of one drive wheel, drive pulley or drive roll, one or more first idler wheels, first idler pulleys or first idler rolls contacting the belt's second top surface and furthermore of one or more second idler wheels, second idler pulleys or second idler rolls contacting the belt's first top surface. Rotary motion is transmitted to both the first and second idler wheels, first idler pulleys or first idler rolls. The sense of rotation (clockwise or counterclockwise) of the second idler wheels, second idler pulleys or second idler rolls is opposite to the sense of rotation of the drive wheel, drive pulley or drive roll and the one or more first idler wheels, first idler pulleys or first idler rolls. The second idler wheels, second idler pulleys or second idler rolls interact with the belt in the same way as described in the previous paragraph for the pressure roller(s), i.e. they impart the belt a concave bend. A noticeable concave bend ensures a sufficient contact surface between belt and second idler wheel, second idler pulley or second idler roll. Preferably here, first idler wheels, first idler pulleys or first idler rolls and second idler wheels, second idler pulleys or second idler rolls are arranged relative to each other in such an order that at least one second idler wheel, second idler pulley or second idler roll simultaneously acts as a pressure roller, as described above, for at least one of the first idler wheels, first idler pulleys or first idler rolls, and vice versa.

The rotary motion (or power transmission) process of the invention, using in particular a flat belt of the invention, may be illustrated as follows: The drive wheel, drive pulley or drive roll transmits a power P (in Watts) to the belt, and the belt in turn transmits a power $P_i$ (in Watts) to each i-th idler wheel, idler pulley or idler roll:

$$P = \omega \tau_U = v F_U = v(F_1 - F_2) = \Sigma_{i=1}^{N} P_i = \Sigma_{i=1}^{N} \omega_i \tau_i \quad (2)$$

In this formula there is assumed no slipping of the belt over any of the involved wheels, pulleys or rolls and essentially no losses in the belt itself. The meanings of its symbols as follows:
  $\omega$ is the angular velocity (in radians/second) of the rotatory motion of the drive wheel, drive pulley or drive roll;
  $\tau_U$ is the momentum or torque (in Newtonmeter) the drive wheel, drive pulley or drive roll exerts on the belt;
  $F_U$ is the peripheral force (in Newton) the drive wheel, drive pulley or drive roll exerts on the belt;
  v is the travel speed of the looping belt (in meter/second);
  $F_1$ is the force inside the belt on its tight side (i.e. running towards the drive wheel, drive pulley or drive roll; upstream of the drive wheel, drive pulley or drive roll, when seen in the belt's travel direction; in Newton);
  $F_2$ is the force inside the belt on its slack side (i.e. running off the drive wheel, drive pulley or drive roll; downstream of the drive wheel, drive pulley or drive roll, when seen in the belt's travel direction; in Newton);
  $P_i$ is the power (in Watts) transmitted to the i-th idler wheel, idler pulley or idler roll;
  $\omega_i$ is the angular velocity (in radians/second) of the rotatory motion of the i-th idler wheel, idler pulley or idler roll; and
  $\tau_i$ is the momentum or load torque (in Newtonmeter) the i-th idler wheel, idler pulley or idler roll produces; and
the sums run over all N idler wheels, idler pulleys or idler rolls to which rotatory motion or power is transmitted by the belt.

The maximum possible ratio between $F_1$ and $F_2$, at which slip of the belt over the drive wheel, drive pulley or drive roll is still avoided, is given by the Eytelwein formula $$\frac{F_1}{F_2} = e^{\mu \beta} \quad (3)$$

wherein
  $\mu$ is the static coefficient of friction (dimensionless) between the surface of the drive wheel, drive pulley or drive roll and the belt's second top surface; and
  $\beta$ is the arc of contact between the belt's second top surface and the surface of the drive wheel, drive pulley or drive roll (in radians), and
  $F_1$ and $F_2$ are as defined for formula (2).

Using (2) and (3) one obtains for the maximum possible power $P_{max}$ that the drive wheel, drive pulley or drive roll can transfer to the belt without slipping:

$$P_{max} = v F_1 (1 - e^{\mu \beta}) \quad (4)$$

$F_1$ can be obtained from the frequency at which the belt transversally vibrates on its tight side, during operation in the rotary motion transmitting setup in question and running at that same travel speed v, on the belt section extending from the drive wheel, drive pulley or drive roll to the idler wheel, idler pulley or idler roll adjacent to the drive wheel, drive pulley or drive roll, and upstream of the drive wheel, drive pulley or drive roll, when seen in the belt's travel direction:

$$F_1 = y^2 \cdot m' \cdot \left( f + \sqrt{f^2 + \frac{v^2}{y^2}} \right)^2 \quad (5)$$

wherein
  y is the length of the said vibrating section of the belt (in meter);
  m' is the belt's weight per unit of its length (in kilograms/meter);
  f is the frequency of the said transversal vibration (in Hertz); and
  v is as defined for formula (2).

Using (5) in (4) the maximum power $P_{max}$ transmittable from the drive wheel, drive pulley or drive roll to the belt without slipping becomes $$P_{max} = v \cdot y^2 \cdot m' \cdot (1 - e^{-\mu\beta}) \cdot \left( f + \sqrt{f^2 + \frac{v^2}{y^2}} \right)^2 \quad (6)$$

wherein all symbols are as defined above. The power P actually transmitted from the drive wheel, drive pulley or drive roll to the belt is desirably as close as possible to $P_{max}$ as calculated by (6). Depending on the operating conditions of the rotary motion transmitting setup in question, shock-like loads and the starting behaviour of its drive motor the power P that is transmittable to the belt without slipping may be somewhat lower than said $P_{max}$. For a predetermined and given power P to be transmitted the parameters of the rotary motion transmitting setup that do appear in the right side of (6) may in this case be adjusted such that the calculated $P_{max}$ exceeds P by a certain safety factor. $P_{max}$ is thus chosen to be typically 1.0 to 1.5 times the said predetermined P. Among the possibilities for increasing the value of $P_{max}$ as calculated by (6) are the increase of the arc of contact $\beta$, and the increase of the belt's width which simultaneously increases m'.

Each i-th idler wheel, idler pulley or idler roll draws a certain power $P_i$ from the running belt, which is due to the load torque $\tau_i$ the idler wheel, idler pulley or idler roll in question produces (see (2)). The maximum power $P_{maxi}$ that the belt can transmit to the i-th idler wheel, idler pulley or idler roll without starting to slip is analogously:

$$P_{maxi} = v \cdot y_i^2 \cdot m' \cdot (1 - e^{-\mu_i \beta_i}) \cdot \left( f_i + \sqrt{f_i^2 + \frac{v^2}{y_i^2}} \right)^2 \quad (7)$$

wherein
- $y_i$ is the length of a belt section extending from the i-th idler wheel, idler pulley or idler roll to the idler wheel, idler pulley or idler roll adjacent to it downstream, when seen in the belt's travel direction, or, if i=N, $y_i$ is equal to y as defined for formulae (5) and (6);
- $f_i$ is the frequency of the transversal vibration of the said vibrating section of length $y_i$; or, if i=N, $f_i$ is equal to f as defined for formulae (5) and (6) (in Hertz);
- $\mu_i$ is the static coefficient of friction (dimensionless) between the surface of the i-th idler wheel, idler pulley or idler roll and the belt's second top surface (if it is a first idler wheel, idler pulley or idler roll in the above sense), or between the surface of the i-th idler wheel, idler pulley or idler roll and the belt's first top surface (if it is a second idler wheel, idler pulley or idler roll in the above sense);
- $\beta_i$ is the arc of contact between the surface of the i-th idler wheel, idler pulley or idler roll and the belt's second top surface (if it is a first idler wheel, idler pulley or idler roll in the above sense), or between the surface of the i-th idler wheel, idler pulley or idler roll and the belt's first top surface (if it is a second idler wheel, idler pulley or idler roll in the above sense); and
- $P_i$ and v are as defined for formula (2) and m' is as defined for formulae (5) and (6).

The presence of a foamed thermoplastic elastomer in the first cover layer prevents glazing of the belt's first top surface and leads to a uniform and sustainable grip between the first top surface of the first cover layer and the conveyed good. Similarly, the presence of a foamed thermoplastic elastomer in the second cover layer provides prevention of glazing of the second top surface and consequently allows for uniform and sustainable grip of the second top surface with a pulley and provides a reliable driving of the belt by the driving pulley(s). The result is a uniform and sustainable driving situation and consequently uniform belt speed. When the belt is used for power transmission the presence of the foamed elastomeric thermoplastic elastomer in both cover layers prevents the glazing of both top surfaces and leads to a uniform and sustainable grip between belt surface and driving pulley. The result is a uniform and sustainable driving situation and consequently uniform belt speed. The frequency of re-tensioning of belt is greatly reduced, or re-tensioning might even become totally unnecessary. The top surfaces of the first and second foamed cover layers are 'self-regenerative'; even if the top surfaces are abraded slightly they 'regenerate' (do not get glossy) and keep their grip without re-tensioning.

The invention will now be described in greater detail with reference to the figures, of which:

Figure 5:
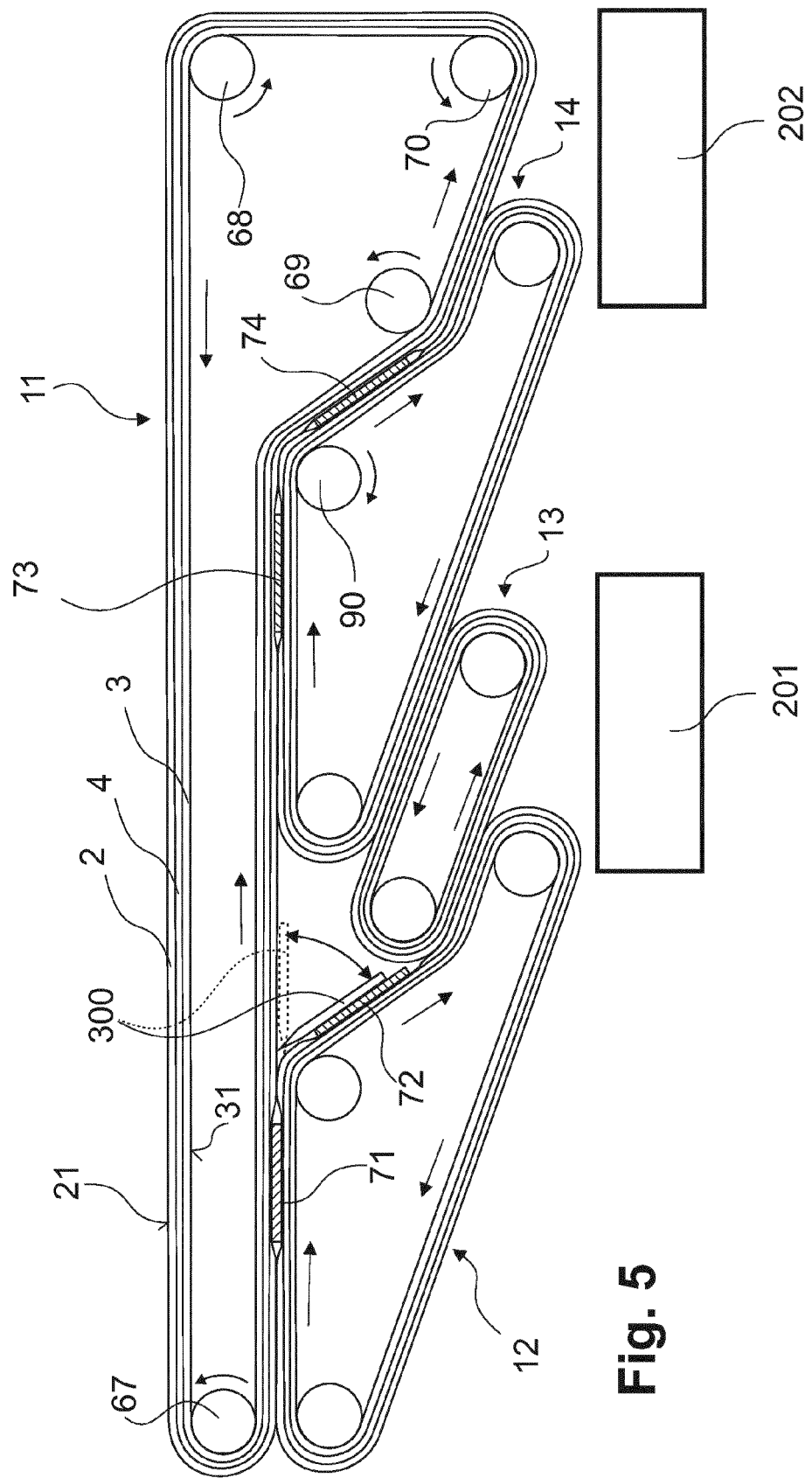
Figure 6:
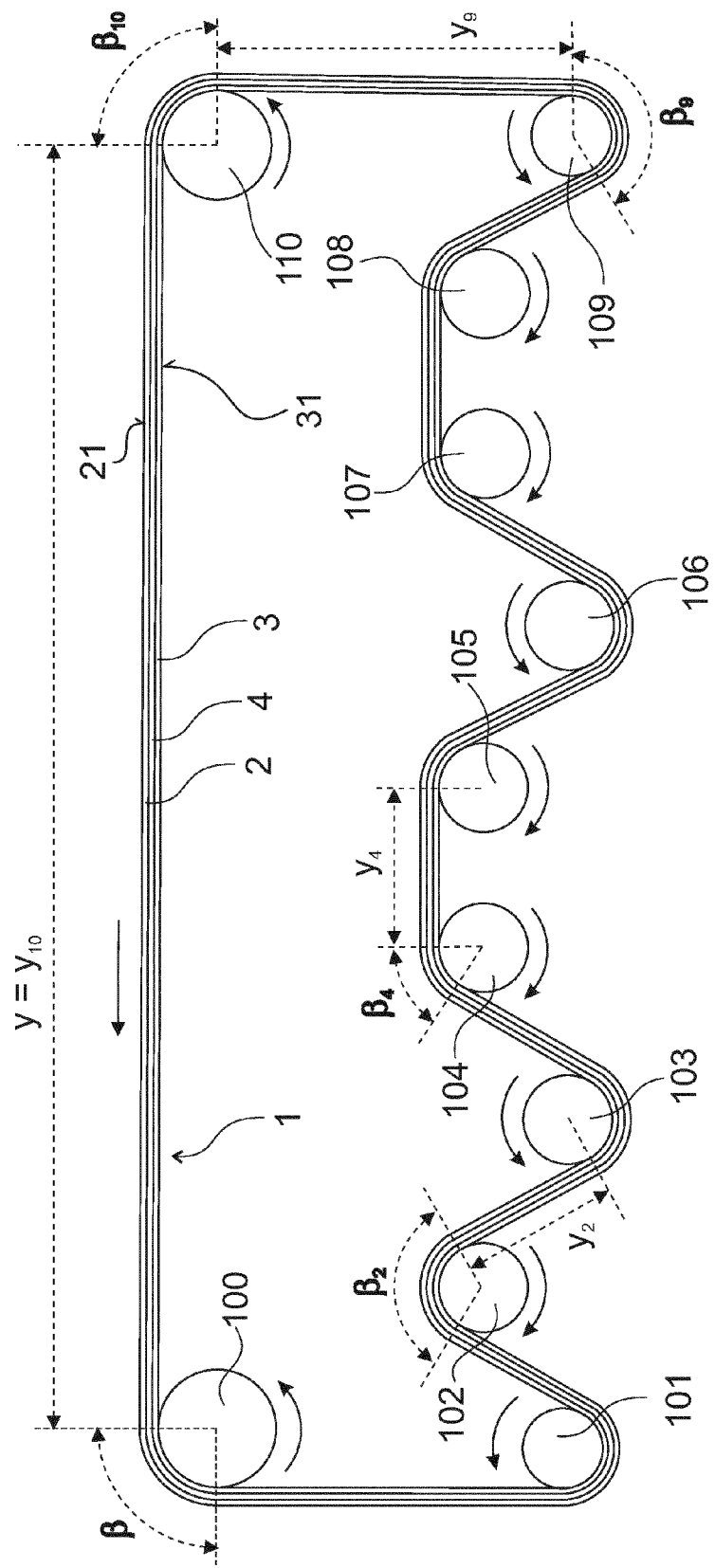

FIG. 5 schematically shows, as a side view, an embodiment of a mail sorting apparatus and of a rotary motion transmitting setup, using a belt of the invention;

FIG. 6 schematically shows, as a side view, a further embodiment of a rotary motion transmitting setup, using a belt of the invention.

Figure 1:
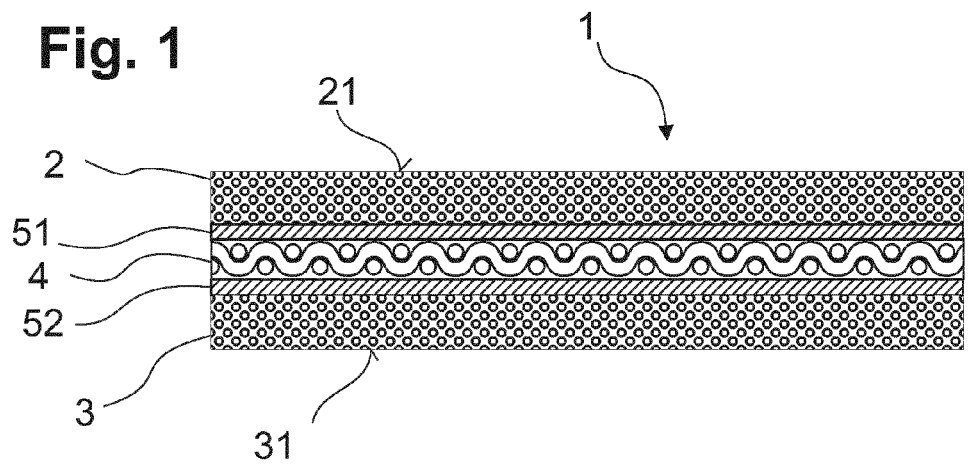
FIG. 1 is a cross-sectional view of a preferred embodiment of the belt of the invention.

With reference to FIG. 1, three exemplary, but preferred embodiments a)-c) of the belt of the invention will be described.

All three embodiments have a first cover layer 2 and a second cover layer 3, both made of the same foamed TPU, and a central traction layer 4 in the form of a plain-weave fabric. All three embodiments have a "symmetrical" arrangement about the central traction layer 4 within the meanings as described before. The TPU of both cover layers of all three embodiments is Estane 58277. In all three embodiments the foaming of the TPU's is done by expandable microspheres, typically in an amount of 2 to 5 percent by weight, more preferably 2 to 4 percent by weight, based on the TPU. Preferably the microspheres have in the maximum expanded state a diameter of 110 to 130 micrometers, with about 120 micrometers being particularly preferred. The expandable microspheres have been employed as a 65% masterbatch in EVA. In all three embodiments a)-c) the foamed layers have been obtained by extrusion using a flat-die extruder with concomitant blowing to obtain the foamed first and second cover layers 2 and 3. The foamed cover layers are then adhered to a plain weave fabric using a crosslinking polyurethane adhesive system. These adhesives form a first adhesive layer 51 which adheres the first cover layer 2 to the central traction layer 4 and a second adhesive layer 52 which adheres the second cover layer 3 to the central traction layer 4.

Embodiment a) is a machine tape intended for use in a mail sorting machine. The expandable microspheres are used in an amount of about 1.7% by weight, based on the TPU, of the masterbatch. The thickness of the first cover layer 2 is about 0.5 to about 0.7 mm, preferably about 0.6 mm. The thickness of the second cover layer 3 is about 0.55 to about 0.75 mm, preferably about 0.65 mm. The fabric of the central traction layer is a plain weave PET fabric of about 0.15 to about 0.25, preferably about 0.18 mm thickness. The total overall thickness of the belt is about 1.4 to about 1.5 mm.

Embodiment b) is a power transmission belt. The thicknesses of the first cover layer 2 and the second cover layer 3 are identical and are each about 0.6 to about 0.8 mm, preferably about 0.72 mm. The expandable microspheres are used in an amount of about 2.1% by weight, based on the TPU, of the masterbatch. The fabric of the central traction layer is a plain weave PET fabric of about 0.5 to about 0.6 mm, preferably about 0.56 mm thickness. The total overall thickness of the belt is about 1.8 to about 1.9 mm.

Embodiment c) is also a power transmission belt. Its features are the same as the ones of embodiment b), except that the thicknesses of the first cover layer 2 and the second cover layer 3 are identical and are each about 0.8 to about 0.9 mm, preferably about 0.84 mm, that the thickness of the fabric as the central traction layer 4 is about 0.8 to about 0.9 mm, preferably about 0.83 mm, and that the overall thickness of the belt is about 2.0 to 2.1 mm.

With reference to FIGS. 1 and 2-4 three embodiments of belt conveyors using a belt according to the invention, as they might be used for conveying a flexible flat good, such as mail, are illustrated. These figures show only a section of the belt 1. The belt 1 would actually be endless (not shown in the FIGS. 1-4) and would loop around further, also not-shown pulleys or rollers. The belt's second cover layer 3, (shown in FIG. 1, but not in FIGS. 2-4) would be in contact with these non-shown pulleys or rollers over its second top surface 31.

Figure 2:
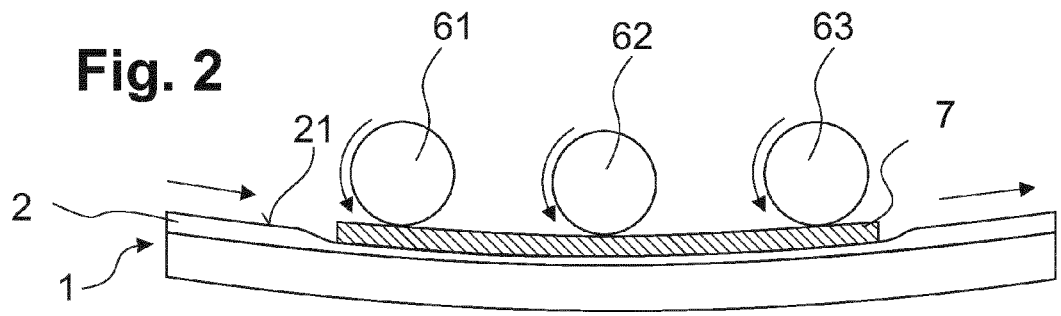
FIGS. 2-4 show, as side view, in schematic way three exemplary conveying arrangements for conveying flat goods, such as mail.

FIG. 2 shows in plan view a part of a belt conveyor 1 which may be employed at a site of a mail sorting machine where the conveyed mail needs to change the direction of travel by some angle. The mail 7 is conveyed by the first top surface 21, cooperating with three rollers 61, 62 and 63 which help to press the mail against the first top surface 21 and simultaneously serve to deflect the belt's travelling direction. They are idler rollers, they only rotate because they are in contact either with the first top surface 21 or with the surface of the conveyed mail 7 when it passes them. The rotational axes of the rollers are typically resiliently movable to account for the variable thickness of the mail 7 passing between the belt and the rollers, in case the compressibility of the first foamed cover layer 2 should not be sufficient to account for that varying thickness. The distance between the axes of the rollers would typically be in the range of 400 to 600 mm. The figure shows two direction arrows on the left and right side; they deviate by about 15 degrees, indicating a change of the direction of travel of the mail by about 15 degrees, although much higher deviations of up to 90 degrees might also be possible.

Figure 3:
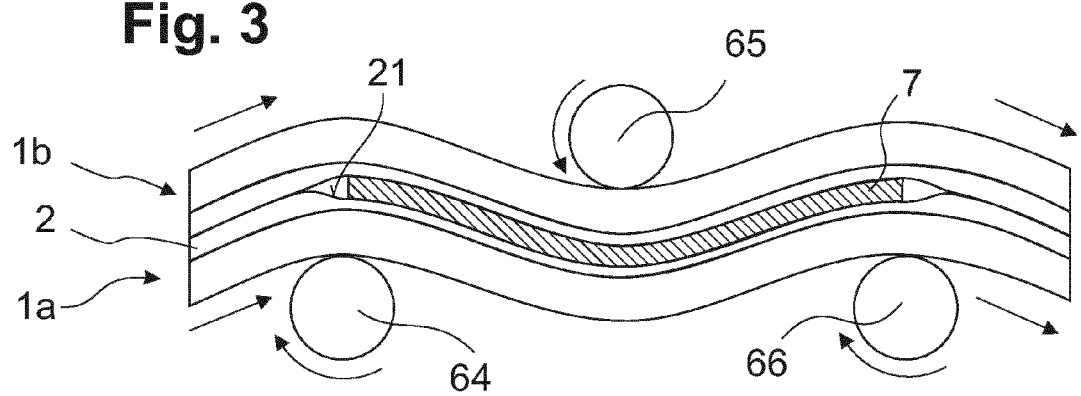

FIG. 3 shows in plan view a schematic representation of a belt conveyor wherein two belts 1a,1b according to the invention cooperate in transporting a flexible flat good 7, such as mail. The two belts are in contact with each other over their first top surfaces (only the first top surface of the belt 1 is designated with reference sign 21). Since both cover layers are of a compressible TPU foam, they allow to some extent for the spatial requirements of the flexible flat good 7, by forming a recess for the good, as shown in the figure. In this arrangement it is possible on the one hand that only one of the belts 1a,1b is driven by a drive pulley, with the other one looping around idler pulleys and being driven only by the contact of the two first top surfaces. These have, by virtue of their surface characteristics, a static friction coefficient high enough to prevent a slip between the two belts 1a,1b. The contact between the two first top surfaces may be enhanced by idler rollers 64, 65, 66 which press the two belts more intimately together and help in keeping the conveyed flat flexible good 7 tightly sandwiched between the two belts 1a,1b. On the other hand it is also possible that each of the two belts 1a,1b is driven individually by a drive pulley.

Figure 4:
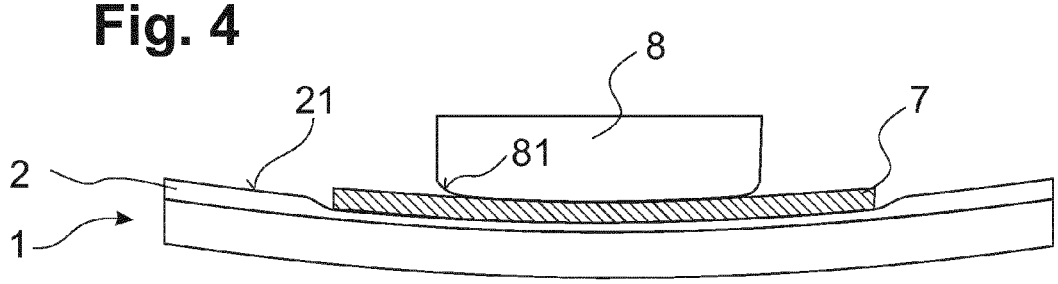

FIG. 4 shows in plan view a schematic representation of a belt conveyor wherein a belt 1 according to the invention cooperates with a fixed support 8 having a sliding surface 81 in transporting a flexible flat good 7, such as mail. The sliding surface 81 should have a low static and low kinetic coefficient of friction together with both the first top surface 21 and the flexible flat good 7. To accomplish this the entire fixed support 8 or at least the portion thereof forming the sliding surface 81 is preferably made of a metal, such as steel or aluminium, or of a plastic with low coefficients of friction such as Teflon. The fixed support 8 presses the transported flexible flat good 7 into the first cover layer 2, which, as shown in the figure, is compressed and forms a bulge which prevents any relative motion of the transported flat flexible good 7 relative to the belt, even when the transported flexible flat good 7 moves relative to the sliding surface 81.

FIG. 5 shows a schematic representation of a mail channel sorter in plan view. It contains four belt conveyors 11, 12, 13 and 14. Each of them uses a belt of the invention, comprising a first cover layer, a central traction layer and a second cover layer. Each of the belts is shown with these three layers; only in the belt within the belt conveyor 11 they have been designated with reference signs 2, 4 and 3, respectively. All belts are operated in a perpendicular orientation. This channel sorter is capable of sorting unsorted or presorted mail 71 into two trays 201, 202. If the belt conveyor 11 was made longer towards the left of the figure (i.e. the roller 67 was farther to the left) and further belt conveyor pairs cooperating in transporting the mail, being identical to the pair of cooperating belt conveyors 12,13, were added, then sorting of the unsorted or presorted mail 71 into multiple trays would be possible. In the shown channel sorter an unsorted or presorted piece of mail 71 is guided by the pair of cooperating belt conveyors 11,12 towards the switch 300. This switch 300 may take two positions, the one pointing towards the bottom in the figure, in which case the unsorted or presorted piece of mail 71 is detoured into the pair of cooperating belt conveyors 12,13, and is guided as a sorted piece of mail 72 into the first tray 201. The switch 300 may also take the other position shown in the figure in dashed lines, in which case the unsorted or presorted mail 71 is guided after passing the switch 300 by the pair of cooperating belt conveyors 11,14 as sorted mail 73,74 into the second tray 202. The position of the switch 300 may e.g. be controlled automatically based on the area code printed on the piece of unsorted or presorted mail 71, which may have been scanned and recognised beforehand by an OCR device. The first cover layers of the belts (only the first cover layer in the belt conveyor 11 is designated with reference sign 2) are compressible, since they are foamed, and allow for pieces of mail of variable thickness to be conveyed. The figures shows how the foamed first cover layers are compressed to some extent by the spatial requirements of the pieces of mail 71, 72, 73, 74. In this embodiment the first top surfaces of all four belts are in contact with each other (only the first top surface in the belt conveyor 11 is designated with the reference sign 21). In view of the properties of the first top surfaces of the inventive belts it is possible, by having all belts contacting each other over their first top surfaces, that all belts are driven by only one single driving pulley or driving roller, to bring all belts into synchronous motion. In the embodiment shown in the figure a pulley or roller around which a belt performs a turn of 150 degrees to 180 degrees, preferably a turn of essentially 180 degrees, is preferred as such sole driving pulley or driving roller. An example therefor is the pulley or roller 67. This setup is also made possible by the properties of the second top surfaces of the second cover layers of the belts (only the second top surface in the belt conveyor 11 is designated with reference sign 31). In this case all other pulleys or rollers shown in the figure are idler pulleys or idler rollers. The thus obtained direction of motion is shown with arrows within the belt loops and is consistent with the intended use of the overall channel sorter. It is obviously also possible to conceive the shown channel sorter in such a way that some or even all belt conveyors do not contact each other with their first top surfaces but are spaced apart by a certain gap. This applies in particular to the pair of belt conveyors 13,14 which do not cooperate in transporting mail. This gap between the first top surfaces of the two belts of a pair of cooperating belt conveyors should preferably be narrower than the expected thickness of the pieces of mail, so that even with that gap the pieces of mail will nevertheless be firmly held by the first top surfaces of two cooperating belts. In this case each belt conveyor will require its own driving pulley.

FIG. 5 simultaneously also illustrates a process embodiment of the present invention of a power transmission belt, wherein a rotary motion is transferred from a drive pulley 67 to one or more first idler pulleys 68, 69, 70 by using an endless belt 11 according to the invention. In one case shown in the figure the belt is bent such that instead of the second cover layer 3 the first cover layer 2 is on the inside of the bend, namely with pulley 90 forming part of the belt conveyor 14. Since the first cover layer 2 is also of a foamed TPU, the same behaviour is observed here with the first cover layer 2 as explained above for the second cover layer 3 when bent around the pulleys 67, 68, 69, 70.

FIG. 6 is an example of an embodiment of a rotary motion transmitting setup, thus of the method for transmitting rotary motion (power transmission) of the invention. There is one drive roll 100 and five first idler rolls 101, 103, 106, 109, 110. An endless belt 1 of the invention loops around all of them; the belt's second top surface 31 is in contact with each of them. Furthermore there are five second idler rolls 102, 104, 105, 107, 108 contacting the belt's first top surface 21. Simultaneously, first idler rolls 101, 103, 106, 109, 110 and second idler rolls 102, 104, 105, 107, 108 act as pressure rollers for each other: First idler rolls 101, 103 act as pressure rollers for second idler roll 102; first idler rolls 103, 106 act as pressure rollers for the two second idler rolls 104, 105; first idler rolls 106, 109 act as pressure rollers for the two second idler rolls 107, 108; second idler rolls 102, 104 act as pressure rollers for first idler roll 103; and second idler rolls 105, 107 act as pressure rollers for first idler roll 106. Idler rolls 101, 102, 103, 104, 105, 106, 107, 108, 109 together impart the belt a "serpentine-like" shape in a side view, similar to the one mentioned in the introduction.

FIG. 6 also shows the meaning and location of some of the parameters used in above formulae (2)-(7). This is firstly the arc of contact $\beta$ between the belt's second top surface 31 and the surface of the drive wheel, drive pulley or drive roll 100. Also shown are, by way of example, the arcs of contact $\beta_2$ and $\beta_4$ between the belt's first top surface 21 and the surface of the idler wheels, idler pulleys or idler rolls 102, 104 (in formulae (2) and (7): i=2 or 4, these two are "second" idler wheels, idler pulleys or idler rolls); the arc of contact $\beta_9$ between the belt's second top surface 31 and the surface of the idler wheel, idler pulley or idler roll 109 (in formulae (2) and (7): i=9, this is a "first" idler wheel, idler pulley or idler roll); and the arc of contact $\beta_{10}$ between the belt's second top surface 31 and the surface of the idler wheel, idler pulley or idler roll 110 (in formulae (2) and (7): i=10=N, this is a "first" idler wheel, idler pulley or idler roll). Furthermore there are shown for idler wheels, idler pulleys or idler rolls 102, 104, 109, 110 the corresponding belt sections with length $y_2$, $y_4$, $y_9$ and $y_{10}$, respectively, on which the vibration frequencies $f_2$, $f_4$, $f_9$ and $f_n$, respectively, are to be measured for formula (7). Since idler wheel, idler pulley or idler roll 110 is the last one (in formulae (2) and (7): i=N=10), the belt section with length $y_{10}$ used to measure the vibration frequency $f_{10}$ for formula (7) is simultaneously the belt section with length y used to measure the vibration frequency f for formulae (5) and (6).

Inventive belts according to embodiment b) and c) and FIG. 1 described above have been running for 1500 hours in a typical mail sorting installation as power transmission belts in a delivery bar code sorter. Only one single re-tensioning was required for each belt during the entire 1500 hour test. There were no problems with belt tracking; the top surfaces of the belts did not show any cracks or other damages, and their static coefficient of friction $\mu_s$ (grip) decreased over that time by not more than 5%. This is a lower loss of grip (glazing out) that the one that was observed with a prior art power transmission belt (UU-10E of Forbo). The delivery bar code sorter using the inventive belts did not become soiled with abraded belt material; there was no deviation in the rotational speed (rpm's) of any of the spindles. It was still operating satisfactory after more than 3800 hours of service, with more that 1.3 million pieces of mail having been sorted during that period.

Two different types of machine tapes were tested in a mail sorting machine for a total of 1500 hours of operation time. The first type of machine tape was according to the invention, with a construction similar to embodiment a and FIG. 1. The second type of tape was the commercially available applicant's reference tape MAB-8E, with a construction similar to the one of examples 1 and 3 of U.S. 2006/0163042. The inventive tape lost after 500 hours of service 10% of its static coefficient of friction, whereas the reference tape lost 25% of its static coefficient of friction after 700 hours of service.

The invention claimed is:

1. A belt comprising a first cover layer with a first top surface, a second cover layer with a second top surface and a central traction layer comprising a fabric or consisting of a fabric, said fabric having warps and wefts; characterised in that the first cover layer consists of a foam comprising a first thermoplastic or first thermoplastic elastomer, wherein the foam of the first cover layer is a closed cell foam and the first cover layer is devoid of a skin; in that the second cover layer consists of a foam comprising a second thermoplastic or second thermoplastic elastomer, wherein the foam of the second cover layer is a closed cell foam and the second cover layer is devoid of a skin; and in that the belt does not have laterally projecting support strips in, at or near its neutral plane, in the form of projections extending laterally from the lateral sides of the belt by a distance long enough and being sufficiently rigid such as that the belt could be supported by such lateral supports on a pulley.

2. The belt of claim 1, characterised in that the foams of the first and second cover layers contain expanded microspheres.

3. The belt of claim 1, characterised in that the foam of the first cover layer comprises a first thermoplastic elastomer, in particular TPU or PEBA, most preferably TPU.

4. The belt of claim 1, characterised in that the foam of the second cover layer comprises a second thermoplastic elastomer, in particular TPU or PEBA, most preferably TPU.

5. The belt of claim 1, characterised in that the first cover layer comprises a first thermoplastic elastomer and the second cover layer comprises a second thermoplastic elastomer, and in that the first thermoplastic elastomer and the second thermoplastic elastomer are identical.

6. The belt of claim 1, characterised in that the foaming degree of the first cover layer is 1 to 60%, preferably 20 to 40%.

7. The belt of claim 1, characterised in that the foaming degree of the second cover layer is 1 to 60%, preferably 20 to 40%.

8. The belt of claim 1, characterised in that the foaming degree of the first cover layer is the same as the foaming degree of the second cover layer.

9. The belt of claim 1, characterised in that it comprises a central traction layer comprising a fabric or consisting of a fabric and in that it has a layer construction which is symmetrical about the central traction layer.

10. A belt conveyor for conveying goods comprising an endless belt by which the goods are conveyed, characterised in that the endless belt is an endless belt according to claim 1, and in that the endless belt is arranged horizontally and the goods are conveyed on the first top surface.

11. A belt conveyor for conveying goods comprising an endless belt by which the goods are conveyed, characterised in that the endless belt is an endless belt according to claim 1, and in that the endless belt is arranged vertically, and the goods are conveyed by the first top surface in cooperation with one or more rotatable pulleys which press the goods against the first top surface.

12. A belt conveyor for conveying goods comprising an endless belt by which the goods are conveyed, characterised in that the endless belt is an endless belt according to claim 1, and in that the endless belt is arranged vertically, and the goods are conveyed by the first top surface in cooperation with a second endless belt according to claim 1, which runs in the same direction and in the same speed as the endless belt and which presses the goods against the top surface.

13. A belt conveyor for conveying goods comprising an endless belt by which the goods are conveyed, characterised in that the endless belt is an endless belt according to claim 1, and in that the endless belt is arranged vertically, and the goods are conveyed by the first top surface in cooperation with a fixed support having a sliding surface, said sliding surface pressing the goods against the first top surface.

14. The belt conveyor according to claim 10, characterised in that the goods to be conveyed are paper or a paper-made good, cardboard or a cardboard-made good, or mail.

15. A method of transferring a rotary motion from a rotating drive wheel, rotating drive pulley or rotating drive roll to one or more idler wheels, idler pulleys or idler rolls using an endless belt looping around the rotating drive wheel, drive pulley or drive roll and around the one or more idler wheels, idler pulleys or idler rolls, characterised in that the endless belt is an endless belt according to claim 1.

16. The method of claim 15, characterised in that it transfers rotary motion to one or more first idler wheels, first idler pulleys or first idler rolls being in contact with the second top surface of the belt, each first idler wheel, first idler pulley or first idler roll imparting the belt looping around it a convex bend; and that it also transfers rotary motion to at least one second idler wheel, second idler pulley or second idler roll being in contact with the first top surface of the belt, each second idler wheel, second idler pulley or second idler roll imparting the belt a concave bend.

17. The belt conveyor according to claim 11, characterised in that the goods to be conveyed are paper or a paper-made good, cardboard or a cardboard-made good, or mail.

18. The belt conveyor according to claim 12, characterised in that the goods to be conveyed are paper or a paper-made good, cardboard or a cardboard-made good, or mail.

19. The belt conveyor according to claim 13, characterised in that the goods to be conveyed are paper or a paper-made good, cardboard or a cardboard-made good, or mail.

* * * * *